US012637142B2

(12) United States Patent
Tatebe et al.

(10) Patent No.: US 12,637,142 B2
(45) Date of Patent: May 26, 2026

(54) INFORMATION PRESENTATION DEVICE

(71) Applicant: SUBARU CORPORATION, Tokyo (JP)

(72) Inventors: Takanori Tatebe, Tokyo (JP); Naoto Yabuki, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 8 days.

(21) Appl. No.: 19/103,717

(22) PCT Filed: Apr. 18, 2023

(86) PCT No.: PCT/JP2023/015425
§ 371 (c)(1),
(2) Date: Feb. 13, 2025

(87) PCT Pub. No.: WO2024/218847
PCT Pub. Date: Oct. 24, 2024

(65) Prior Publication Data
US 2026/0054774 A1 Feb. 26, 2026

(51) Int. Cl.
*B60W 50/16* (2020.01)
*B62D 15/02* (2006.01)

(52) U.S. Cl.
CPC ......... *B62D 15/0225* (2013.01); *B60W 50/16* (2013.01); *B60W 2530/20* (2013.01); *B60W 2555/20* (2020.02)

(58) Field of Classification Search
None
See application file for complete search history.

(56) References Cited

U.S. PATENT DOCUMENTS 5,541,590 A * 7/1996 Nishio ................ B60R 16/0231
348/148
2015/0085615 A1* 3/2015 Perrin ................... G01S 3/8027
367/129

(Continued)

FOREIGN PATENT DOCUMENTS

JP 2007-62706 A 3/2007
JP 2010-167828 A 8/2010
JP 2016-66912 A 4/2016

OTHER PUBLICATIONS

International Search Report (with English translation) and Written Opinion dated Jun. 20, 2023, from corresponding International Application No. PCT/JP2023/015425, 9 pages.

*Primary Examiner* — John F Mortell
(74) *Attorney, Agent, or Firm* — Rimon P.C.

(57) ABSTRACT

An information presentation device is configured to be provided in a vehicle including a steering device that steers a wheel and has a variable steering gear ratio. The information presentation device includes: an amount-of-steering-operation detector configured to detect an amount of a steering operation by a driver; a steering gear ratio detector 10 configured to detect the steering gear ratio; a vibration waveform generator configured to generate a vibration waveform; a vibrator configured to cause vibration of one or both of the air around an occupant and a member in contact with the occupant, using the vibration waveform; and a gain adjuster configured to increase an output gain of the vibration waveform in accordance with an increase in an absolute value of a differential value of a value obtained by multiplying the amount of the steering operation by a reciprocal of the steering gear ratio.

10 Claims, 11 Drawing Sheets

(56) References Cited

U.S. PATENT DOCUMENTS

| 2020/0361523 | A1* | 11/2020 | Nakamura | B62D 15/0235 |
| 2023/0249714 | A1* | 8/2023 | Shono | B60G 21/055 |
| | | | | 701/23 |

* cited by examiner

[ FIG. 1 ]
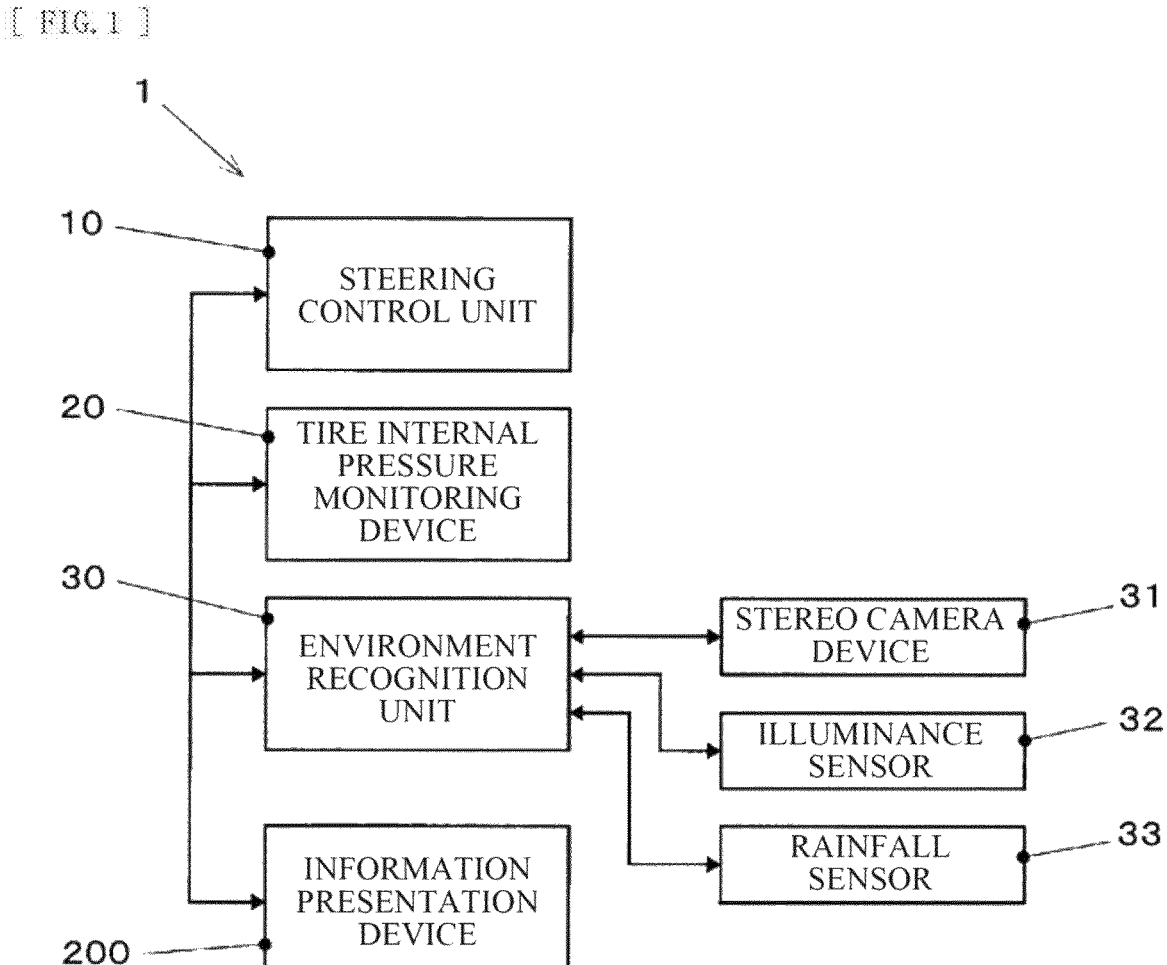

[ FIG. 2 ]
[ FIG. 3 ]
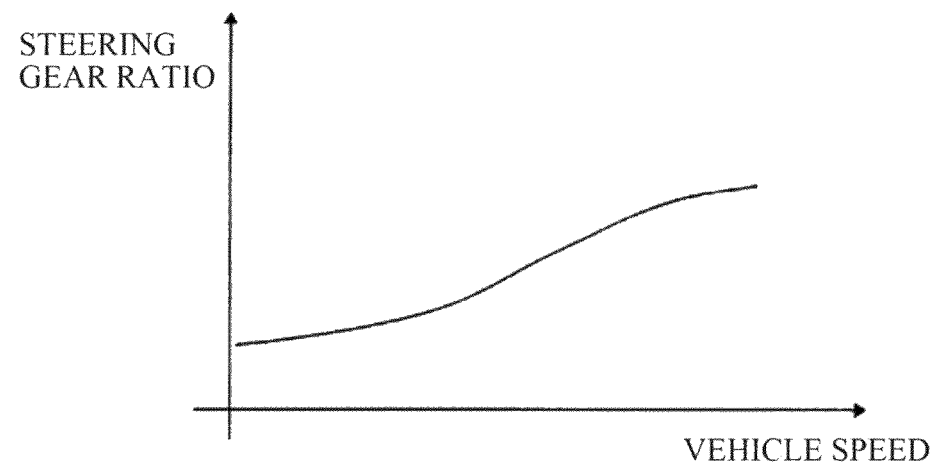

[ FIG. 4 ]
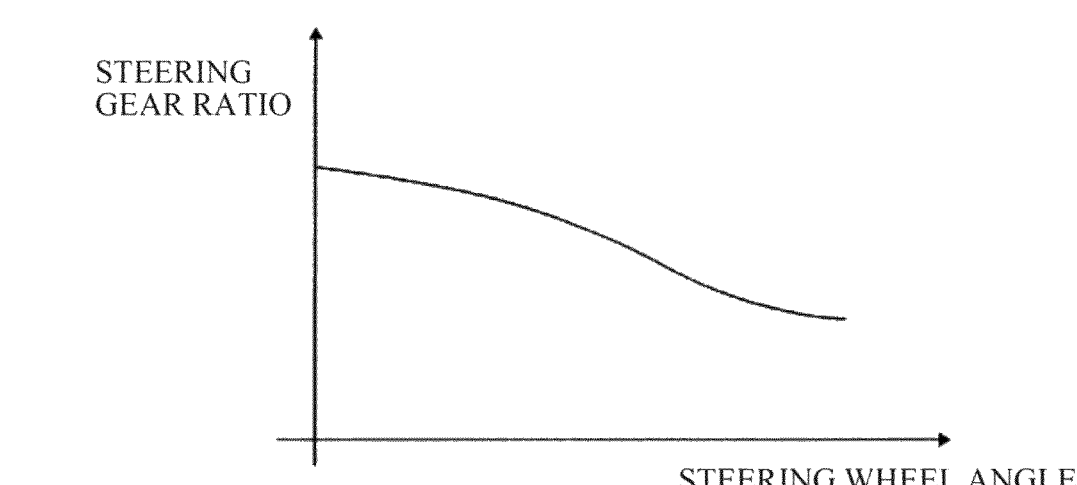

[FIG. 5]

[FIG. 6]
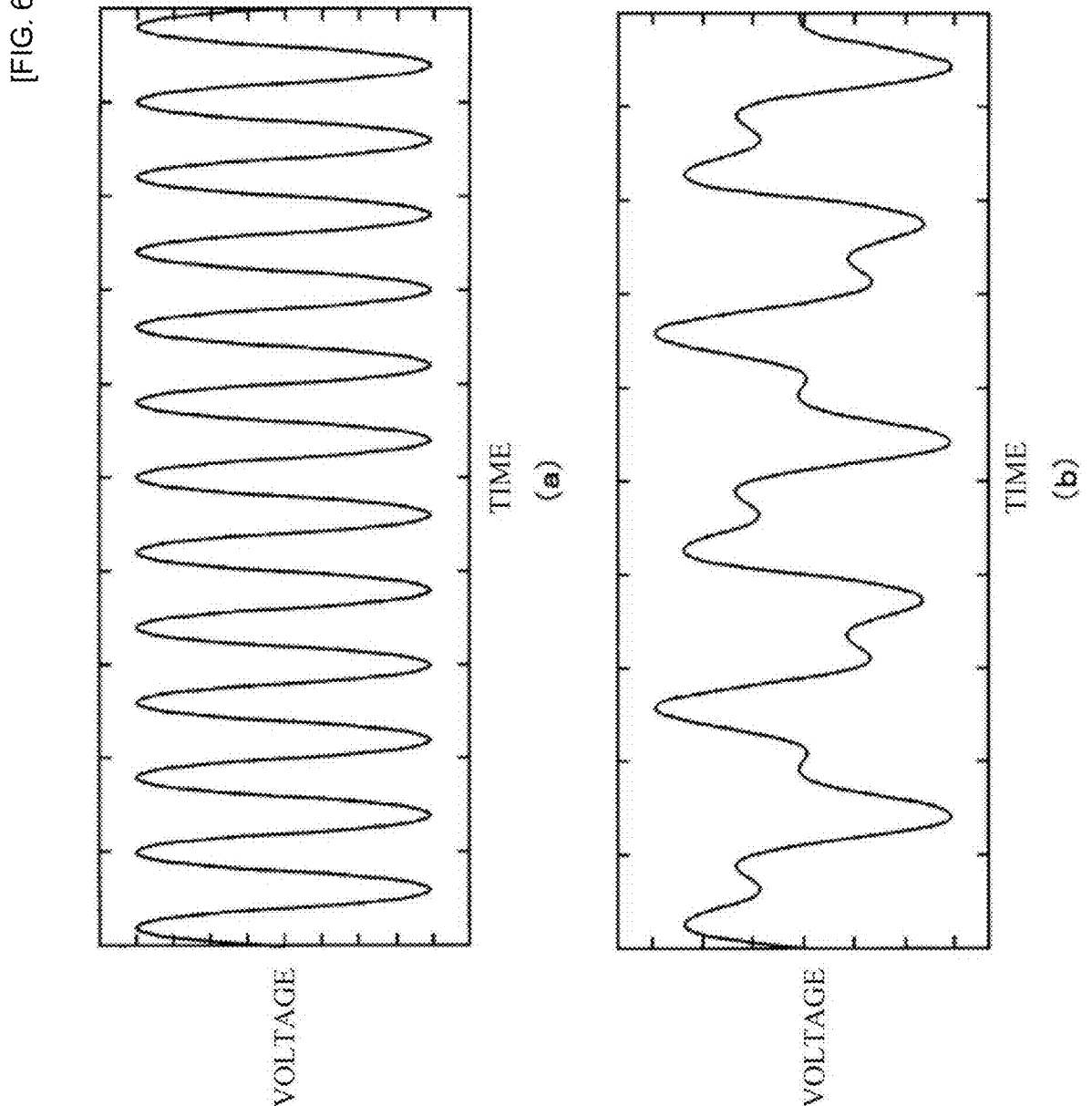

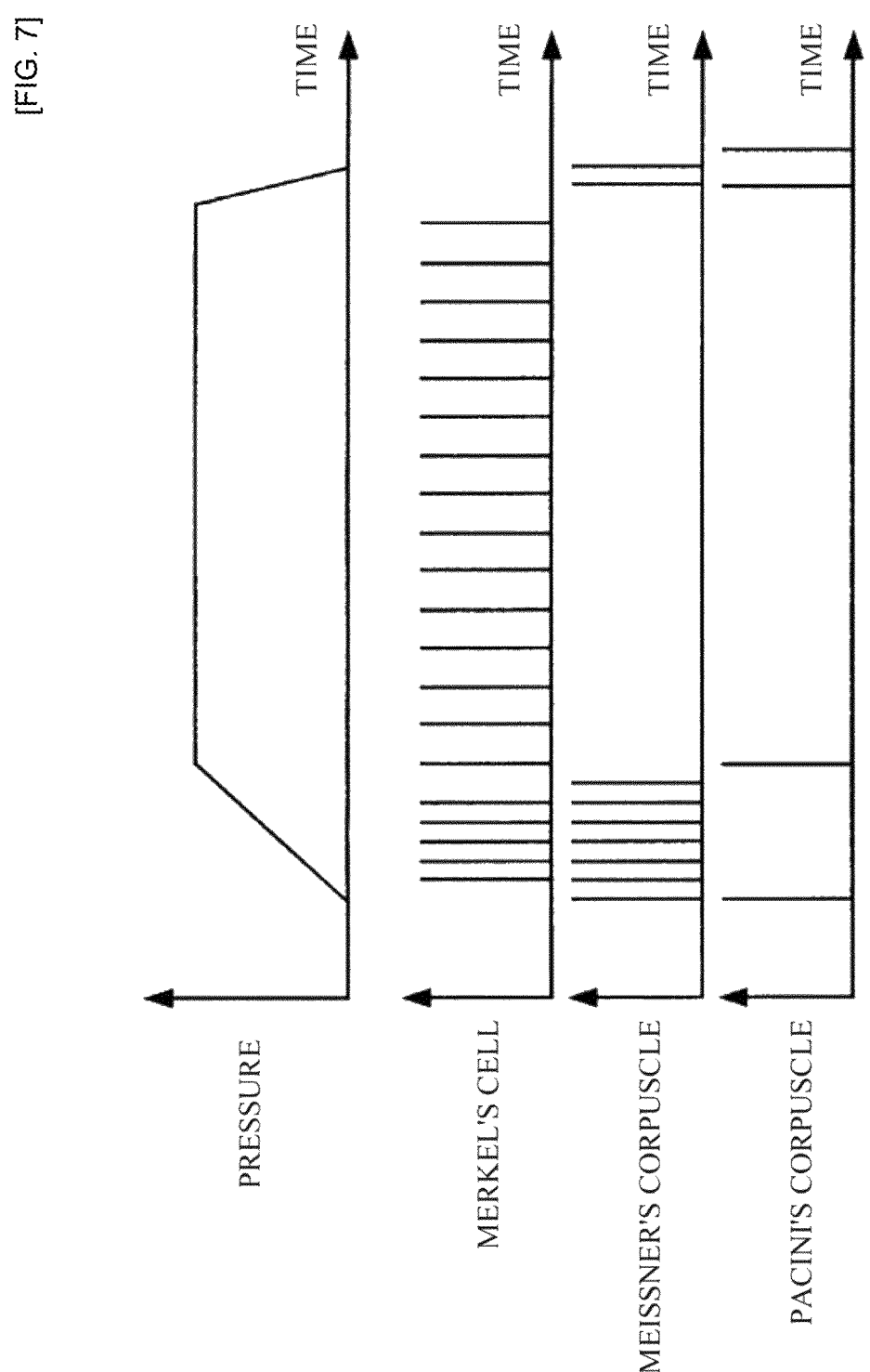
[FIG. 7]

[ FIG. 8 ]
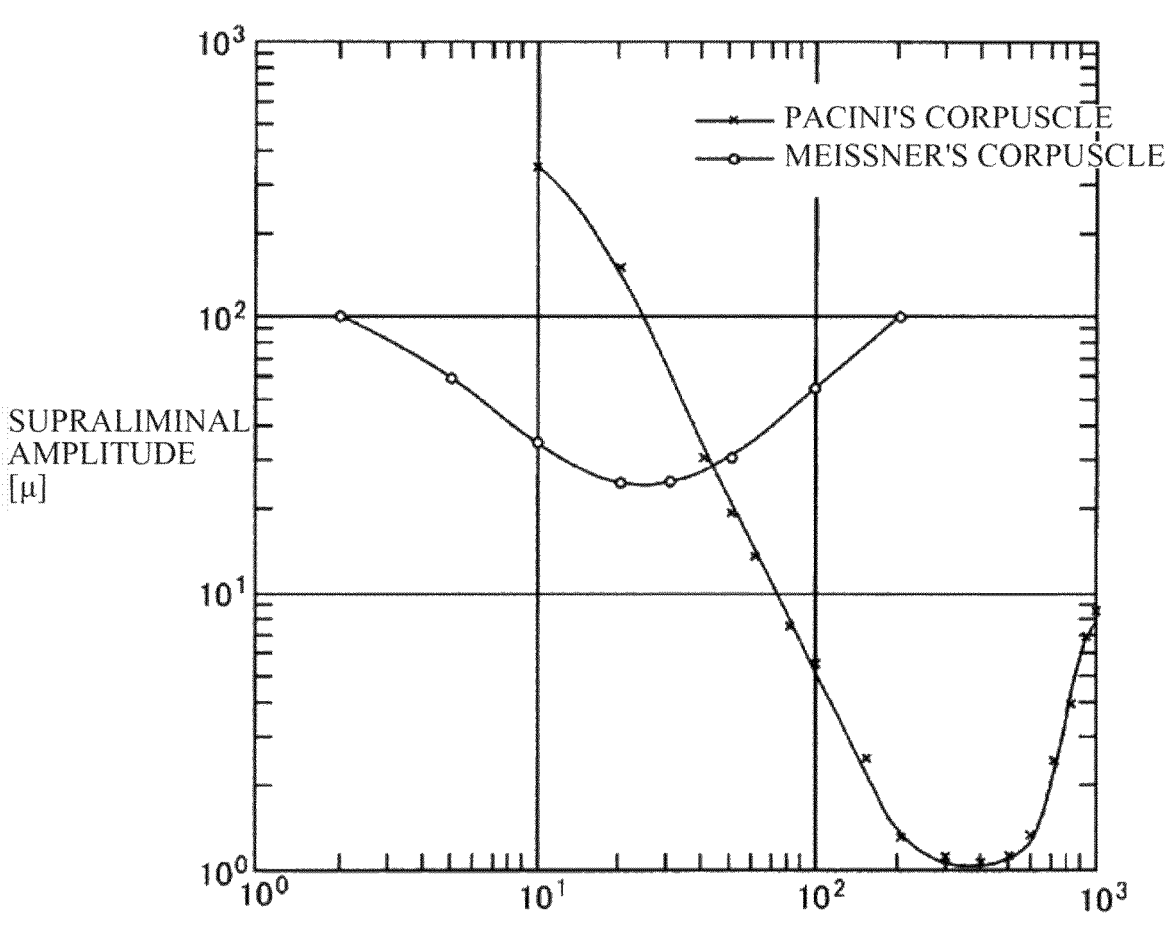
FREQUENCY [Hz]

[FIG. 9]
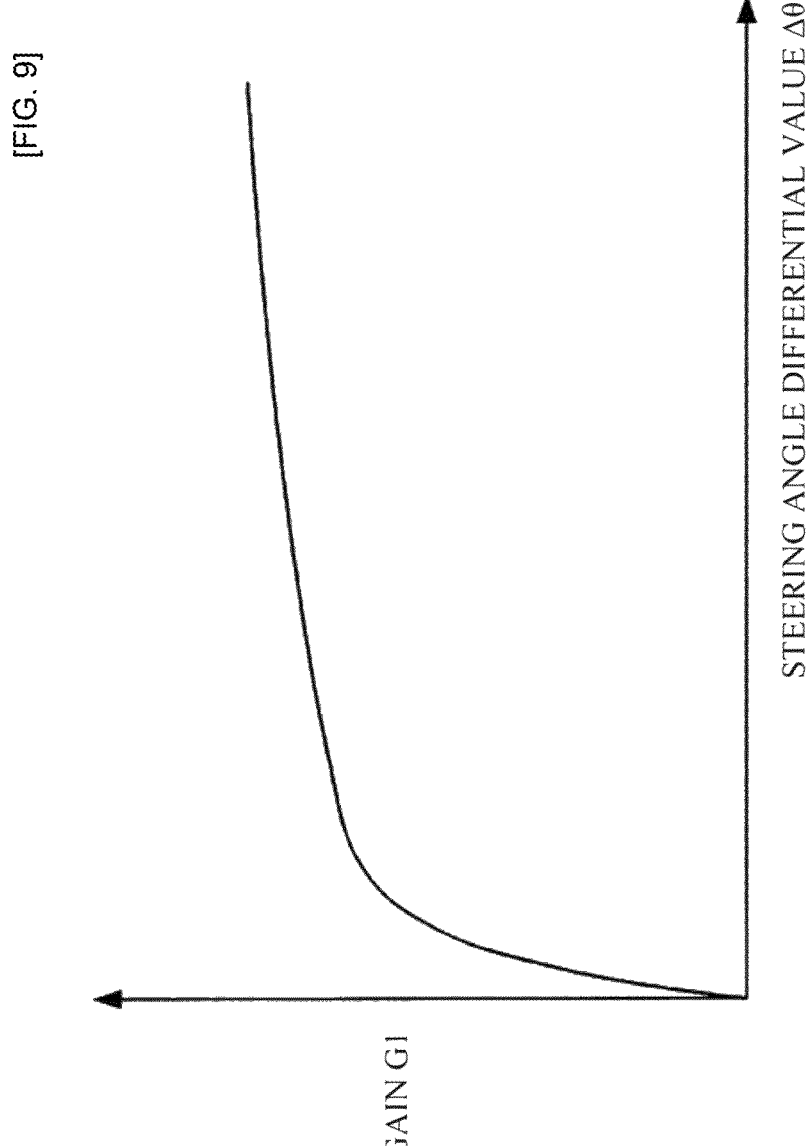

[ FIG. 10 ]
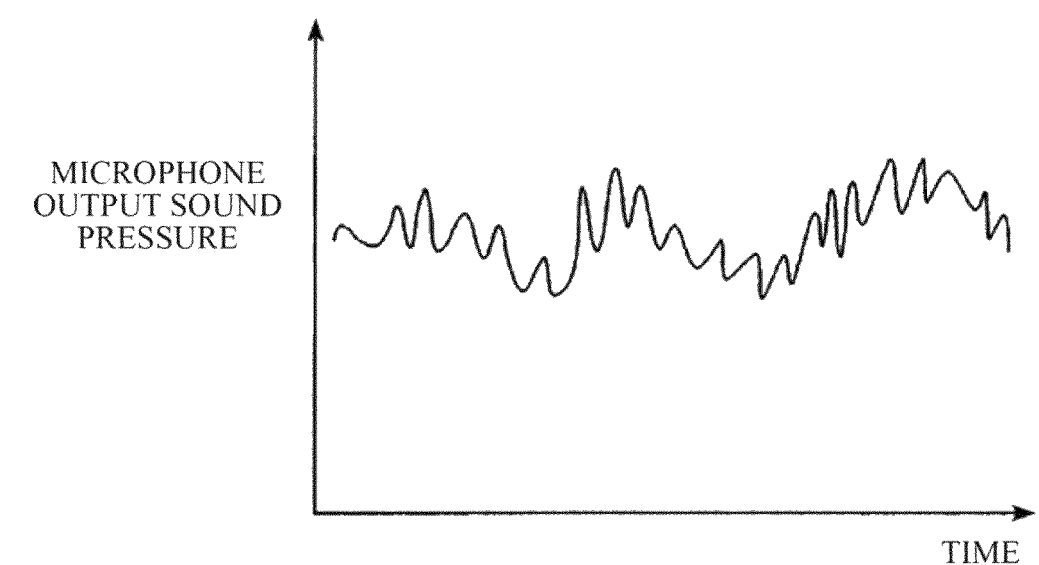
[ FIG. 11 ]
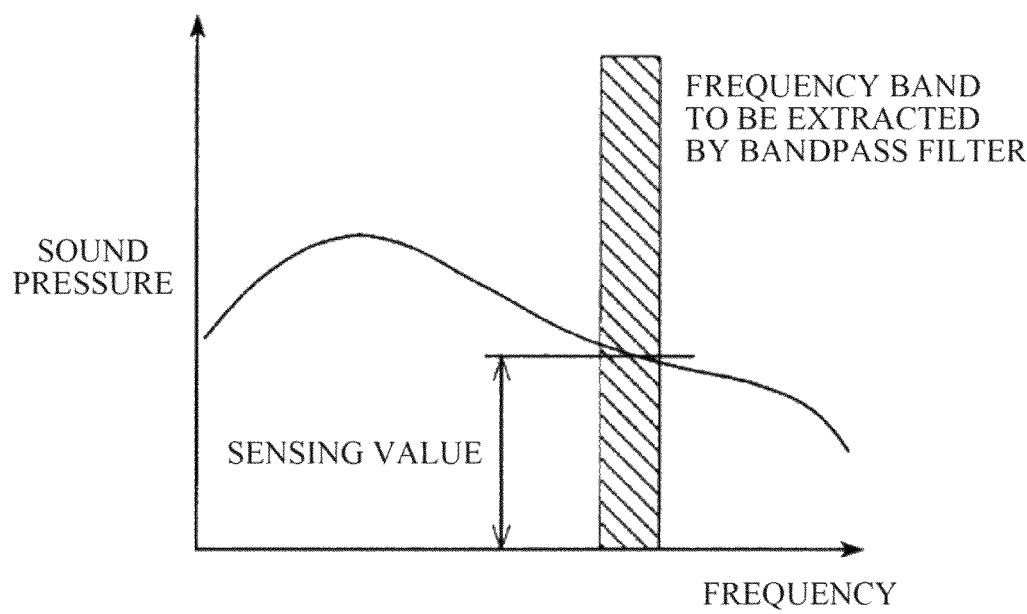

[FIG. 12]
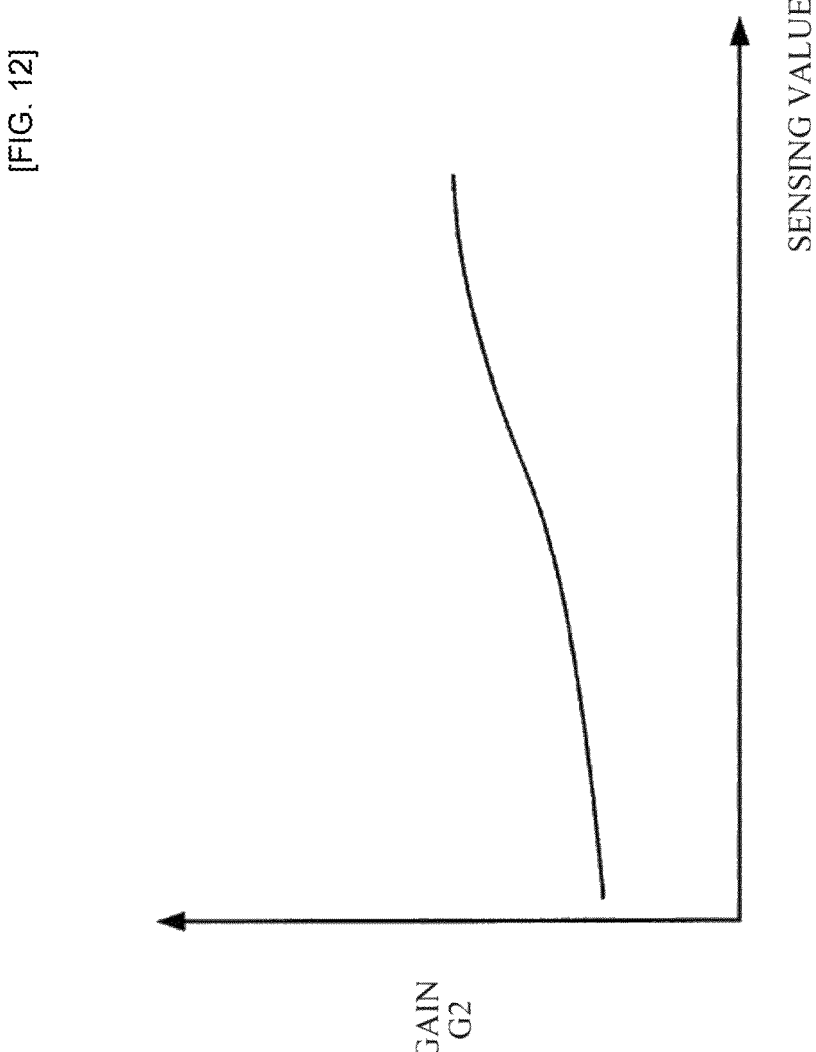

[FIG. 13]
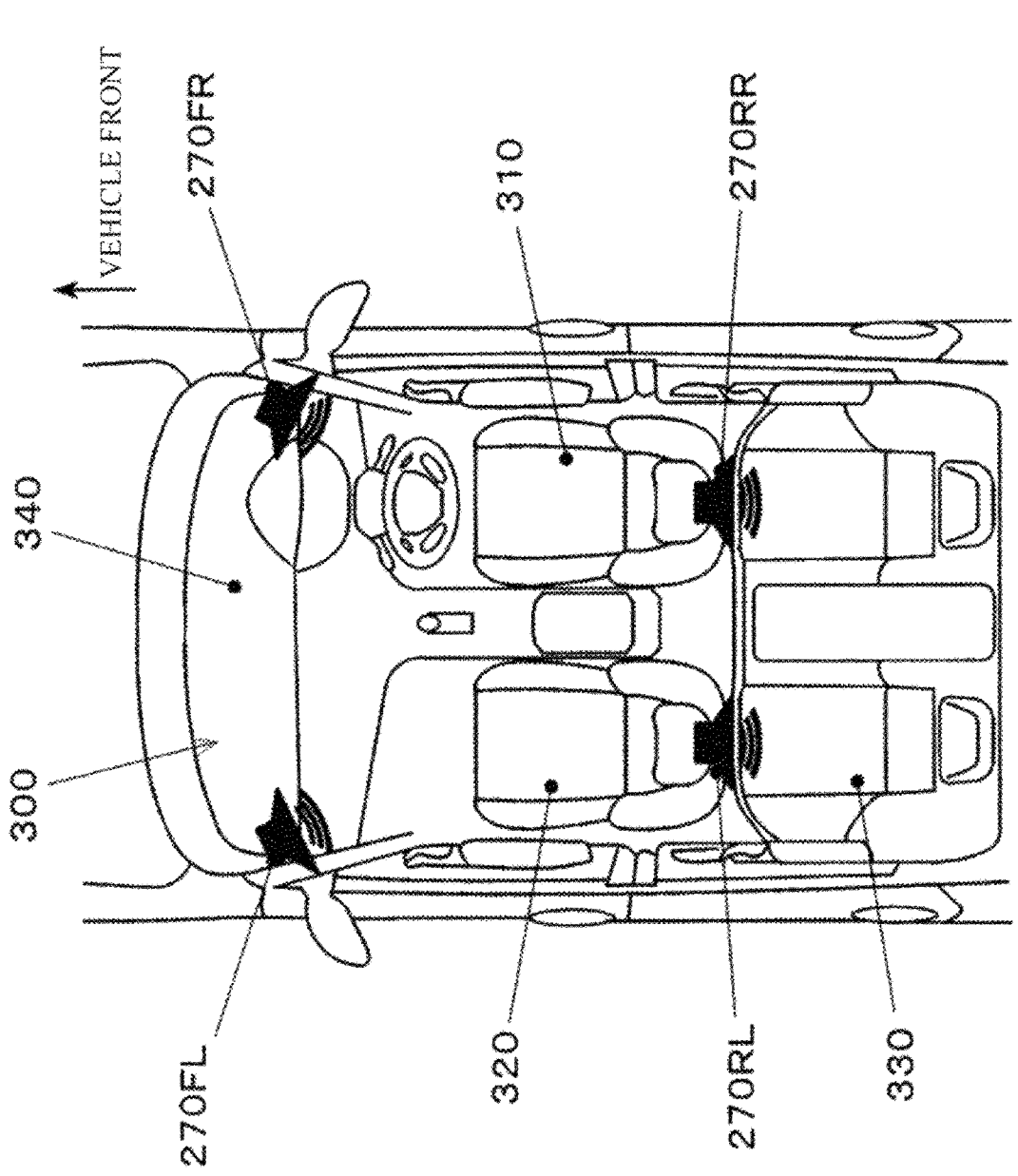

INFORMATION PRESENTATION DEVICE

CROSS-REFERENCE TO RELATED APPLICATIONS

This application is the U.S. National Phase under 35 U.S.C. § 371 of International Application No. PCT/JP2023/015425, filed on Apr. 18, 2023, the entire contents of which are hereby incorporated by reference.

TECHNICAL FIELD

The invention relates to an information presentation device that presents an occupant of a vehicle with information regarding behavior of the vehicle.

BACKGROUND ART

In vehicles such as automobiles, as a technique related to outputting a sound to an occupant in accordance with a state of a vehicle, for example, Patent Literature 1 provides description that an amount of turning a steering wheel is indicated by a sound that varies in association with the amount of turning, to provide a driver assistance apparatus that makes it possible to easily recognize a steering angle and a direction of steering.

Specifically, the description includes making a control to raise a pitch on a musical scale as the amount of turning increases, and indicating the amount of turning the steering wheel by changing sound intensity, a sound pitch, a tone, sound pressure, a frequency, a position of a sound image, and the like.

Patent Literature 2 describes a music generation device for a vehicle in which a musical piece reflecting behavior of a vehicle or an operation by a driver is generated in a simple way. The music generation device includes a storage unit and a control unit. The storage unit holds multiple sound source loop patterns corresponding to respective pieces of information based on the operation by the driver of the vehicle or the behavior of the vehicle. The control unit selects a specific sound source loop pattern from among the multiple sound source loop patterns in accordance with each piece of information and make an output control or an output stop control.

CITATION LIST

Patent Literature

Patent Literature 1: Japanese Unexamined Patent Application Publication No. 2007-62706
Patent Literature 2: Japanese Unexamined Patent Application Publication No. 2016-66912

SUMMARY OF INVENTION

Problem to be Solved by the Invention

In a vehicle in which a steering gear ratio (a deceleration rate of a front wheel steering angle with respect to a steering wheel angle) is variable, it is possible to change a gear ratio in accordance with a range of a steering angle to be used and a vehicle speed, to provide a characteristic suitable for a scene.

For example, in a low-speed region of the vehicle speed, reducing the gear ratio to a quick gear ratio makes it possible to obtain ease of handling and the sense of lightness. In contrast, in a high-speed region, raising the gear ratio to a slow gear ratio makes it possible to realize a vehicle characteristic with high stability and calmness.

However, in a scene in which a road surface with ice and snow is slippery, a situation easily occurs in which behavior is disturbed in the low-speed region (a sideslip and behavior with a spinning tendency). In this case, it is necessary to control the behavior by correction steering such as counter steering. At this occasion, in the case of a vehicle with setting of the quick gear ratio in the low-speed region of the vehicle speed, resolution of operation of a steering wheel must be finely controlled, which causes difficulty in driving.

To address this, it is conceivable to set the slow gear ratio, but, in this case, a merit inherent in the variable gear ratio is lost.

It is also conceivable to determine vehicle behavior and flexibly change the gear ratio. However, in this case, reproducibility of the vehicle behavior by the steering angle is lowered, which gives the driver the sense of anxiety.

In view of the problem described above, an object of the invention is to provide an information presentation device with enhanced recognizability of information regarding a steering angle even when a steering gear ratio is variable.

Means for Solving the Problem

To solve the problem described above, an information presentation device according to an aspect of the invention is an information presentation device configured to be provided in a vehicle including a steering device. The steering device is configured to steer a wheel and has a variable steering gear ratio. The information presentation device includes: an amount-of-steering-operation detector configured to detect an amount of a steering operation by a driver; a steering gear ratio detector configured to detect the steering gear ratio; a vibration waveform generator configured to generate a vibration waveform; a vibrator configured to cause vibration of one or both of the air around an occupant and a member in contact with the occupant, using the vibration waveform; and a gain adjuster configured to increase an output gain of the vibration waveform in accordance with an increase in an absolute value of a differential value of a value obtained by multiplying the amount of the steering operation by a reciprocal of the steering gear ratio.

According to this, by generating audio of which sound pressure increases in accordance with the increase in the absolute value of the differential value (a so-called steering speed) of the parameter correlated with the amount of steering of the steering device, it is possible to allow, by the audio, an occupant to predict occurrence of behavior at an initial stage of the steering, before a lateral acceleration rate, a yaw rate, a roll angle, and the like actually occur in the vehicle.

This enhances the occupant's predictability of the vehicle behavior, making it possible to prevent the occupant from having a feeling of abruptness about the behavior of the vehicle.

Moreover, by increasing the output gain of the vibration waveform in accordance with the increase in the absolute value of the differential value of the value obtained by multiplying the amount of the steering operation by the reciprocal of the steering gear ratio, it is possible to allow the occupant to appropriately grasp the information regarding an actual amount of steering a steered wheel (a steering angle) even in a vehicle in which the steering gear ratio is variable.

Furthermore, by generating the vibration waveform in accordance with the driving operation, it is possible to recognize the amount of operation with finer resolution than resolution of the steering angle inherent in the driver. Hence, it is possible to make a finer control, leading to enhanced controllability and easier driving, even in a case with setting of, for example, a quick steering gear ratio.

In the invention, a configuration may be adopted in which the vibration waveform includes a dominant frequency included in a frequency band of 100 to 400 Hz.

According to this, it is possible to use Pacini's corpuscles or the like having high sensitivity to skin sensation in an audible range, leading to the occupant's favorable perception of the sound and the occupant's favorable recognition of the skin sensation by the audio. Hence, it is possible to transmit the information to the occupant more reliably.

Here, more preferably, by setting the dominant frequency in a frequency band of 150 to 300 Hz, it is possible to use a more favorable region of the sensitivity of receptors and to facilitate the effects described above.

In the invention, a configuration may be adopted in which the gain adjuster is configured to set the output gain to inhibit sound pressure generated by the vibration by the vibrator from dominating a background noise while the vehicle is traveling, near an ear of at least one occupant.

According to this, the audio caused by the vibration by the vibrator is drowned out by the background noise of the vehicle. This makes it possible to prevent the occupant from feeling annoying, and to appropriately transmit the information.

In the invention, a configuration may be adopted in which an internal pressure detector is provided. The internal pressures detector is configured to detect tire internal pressure of the wheel. The gain adjuster is configured to increase the output gain in accordance with an increase in the tire internal pressure.

In automobiles, a steering torque gradient changes with magnitude of tire internal pressure. Because the driver determines the amount of turning the steering wheel by the steering torque gradient other than the steering angle, the change in the torque gradient contributes to difficulty in driving.

According to the invention, by adjusting the output gain of the vibration waveform of the information presentation device based on a monitoring result of the tire internal pressure, it is possible to suppress the change in the torque gradient to be sensed by the driver and to ensure ease of driving.

In the invention, a configuration may be adopted in which a low visibility detector is provided. The low visibility detector is configured to make detection of low visibility around the subject vehicle. The gain adjuster is configured to increase the output gain in accordance with the detection of the low visibility.

When a person drives, mainly the sense of vision provides information, and driving is performed depending on the sense of vision. The information is recognized by supplementing the sense of vision with the sense of hearing and the sense of touch, and the driving is performed by repeating processes of recognizing the information, making a determination, and making an operation.

According to the invention, considering that a ratio of dependence on the supplementary senses, i.e., the sense of hearing and the sense of touch, becomes higher in a situation with poor visibility, increasing the output gain of the vibration waveform of the information presentation device makes it possible to increase an amount of information obtained from the sense of hearing and the sense of touch, and to ensure ease of driving.

Effects of the Invention

As described above, according to the invention, it is possible to provide an information presentation device with enhanced recognizability of information regarding a steering angle even when a steering gear ratio is variable.

BRIEF DESCRIPTION OF DRAWINGS

FIG. 1 is a diagram schematically illustrating a system configuration of a vehicle including an embodiment of an information presentation device to which the invention is applied.

FIG. 2 is a diagram schematically illustrating a configuration of a steering device of the vehicle including the information presentation device of the embodiment.

FIG. 3 is a graph schematically illustrating an example of a correlation between a vehicle speed and a steering gear ratio.

FIG. 4 is a graph schematically illustrating an example of a correlation between a steering angle and the steering gear ratio.

FIG. 5 is diagram schematically illustrating a system configuration of the information presentation device of the embodiment.

FIG. 6 is a graph schematically illustrating examples of a vibration waveform in the embodiment.

FIG. 7 is a chart schematically illustrating respective timings of electric pulses emitted by receptors upon receiving stimuli.

FIG. 8 is a diagram illustrating respective distributions of sensitivity to a frequency of Pacini's corpuscles and Meissner's corpuscles.

FIG. 9 is a graph schematically illustrating an example of gain adjustment in a first gain adjuster.

FIG. 10 is a graph schematically illustrating an example of an output history of a microphone.

FIG. 11 is a graph illustrating an example of a correlation between a sound pressure and a frequency of a background noise.

FIG. 12 is a graph schematically illustrating an example of gain adjustment in a second gain adjuster.

FIG. 13 is a diagram schematically illustrating arrangement inside a vehicle compartment of the vehicle provided with the information presentation device of the embodiment.

MODES FOR CARRYING OUT THE INVENTION

In the following, an embodiment of an information presentation device to which the invention is applied is described.

The information presentation device of the embodiment is provided in, for example, a vehicle such as a four-wheel passenger car.

FIG. 1 is a diagram schematically illustrating a system configuration of the vehicle including the information presentation device of the embodiment.

As illustrated in FIG. 1, a vehicle 1 includes a steering control unit 10, a tire internal pressure monitoring device 20, an environment recognition unit 30, and an information presentation device 200, and the like.

The steering control unit 10 makes a synthetic control of a steering device 100 as a steer-by-wire steering system.

A configuration of the steering device 100 is described later in detail.

The tire internal pressure monitoring device 20 is a device (internal pressure detector) that monitors internal pressure (air pressure) of a tire of the vehicle 1.

The tire internal pressure monitoring device 20 includes, for example, a communication device that receives information wirelessly transmitted from an internal pressure sensor provided in a valve cap or the like of the tire.

The environment recognition unit 30 is a device that recognizes environment around the subject vehicle using various sensors.

To the environment recognition unit 30, for example, a stereo camera device 31, an illuminance sensor 32, and a rainfall sensor 33, and the like are coupled.

The stereo camera device 31 is an imaging device including a pair of stereo cameras installed toward front of the subject vehicle.

The illuminance sensor 32 is a sensor that detects illuminance around the subject vehicle.

The rainfall sensor 33 is a sensor that detects a rainfall state based on, for example, vibration of glass of a windshield.

The environment recognition unit 30 is configured to recognize a state in which visibility in a field of vision around the subject vehicle is lowered, based on an output of each sensor.

The environment recognition unit 30 serves as a low visibility detector that makes detection of low visibility around the subject vehicle in cooperation with each sensor.

The information presentation device 200 is a device that presents an occupant with information by audio based on behavior of the steering device 100.

A configuration of the information presentation device 200 is described later in detail.

The vehicle includes the steering device 100 described below, to steer a right front wheel FWR and a left front wheel FWL as steered wheels.

FIG. 2 is a diagram schematically illustrating a configuration of a steering device of a vehicle including the information presentation device of the embodiment.

As illustrated in FIG. 2, the steering device 100 is an electric steer-by-wire steering device including a steering wheel 110, a reaction force generation device 120, a rack shaft 130, a rack housing 140, tie rods 150, housings 160, an actuator unit 170, and the like.

The steering wheel 110 is an annular operation member (steering inputter) that a driver turns to input a steering operation.

The steering wheel 110 is disposed to oppose a driver's seat in a vehicle compartment of the vehicle.

On the steering wheel 110, a steering shaft 111, a steering wheel angle sensor 112, and a torque sensor 113 are provided.

The steering shaft 111 is a rotating shaft that has one end attached to the steering wheel 110.

The steering wheel angle sensor 112 is an amount-of-steering-operation detector that is provided in an intermediate portion of the steering shaft 111 and detects a rotation angle position (an amount of an operation by a driver) of the steering shaft 111.

The torque sensor 113 is provided in the intermediate portion of the steering shaft 111, and a region on side on which the reaction force generation device 120 is provided with respect to the steering wheel angle sensor 112. The torque sensor 113 detects torque (an operation force or a gripping force of the steering wheel 110 by the driver) to be applied to the steering shaft 111.

Outputs of the steering wheel angle sensor 112 and the torque sensor 113 are transmitted to the steering control unit 10.

The steering control unit 10 controls an output of a motor 171 of the actuator unit 170 in accordance with the outputs of the steering wheel angle sensor 112 and the torque sensor 113.

The reaction force generation device 120 includes an actuator that applies torque to the steering shaft 111 in accordance with a command from the steering control unit 10 to generate a pseudo-steering reaction force.

An output shaft portion of the reaction force generation device 120 is coupled to an end portion of the steering shaft 111 opposite to side on which the steering wheel 110 is disposed.

The rack shaft 130 is a columnar member disposed to cause its longitudinal direction (axial direction) to be aligned with the vehicle width direction.

The rack shaft 130 is supported to be translatable in the vehicle width direction relative to a vehicle body.

The rack shaft 130 has a part including the rack gear 131. The rack gear 131 is engaged with a pinion gear of a pinion shaft 173.

The rack gear 131 is driven by the pinion gear in response to rotation of the steering shaft 111 to thereby translate (move linearly) the rack shaft 130 in the vehicle width direction.

The rack housing 140 is a substantially cylindrical member that houses the rack shaft 130 while supporting the rack shaft 130 in such a manner that the rack shaft 130 is relatively displaceable in the vehicle width direction.

The rack housing 140 cooperates with the rack shaft 130, the pinion shaft 173, and the like to constitute a steering gearbox.

The rack housing 140 has both ends each including a rack boot 141.

The rack boots 141 are each a member that prevents ingress of foreign matter such as dust into the rack housing 140 while allowing relative displacement of the corresponding tie rod 150 relative to the rack housing 140.

The rack boots 141 are each formed into a shape of a bellows tube having flexibility and including, for example, a resin material such as an elastomer.

The tie rods 150 are each a shaft-shaped interlocking member that couples a corresponding end of the rack shaft 130 to a knuckle arm 161 of the corresponding housing 160 and turns the housing 160 around a kingpin axis in conjunction with the translational motion of the rack shaft 130.

The tie rods 150 each have an inner end in the vehicle width direction. The inner end in the vehicle width direction is pivotally coupled to the corresponding end of the rack shaft 130 via a ball joint 151.

The tie rods 150 each have an outer end in the vehicle width direction. The outer end in the vehicle width direction is coupled to the knuckle arm 161 of the corresponding housing 160 via a ball joint 152.

At a coupling portion between the tie rod 150 and the ball joint 152, an unillustrated turnbuckle mechanism for toe-in adjustment is provided.

The housings (knuckles) 160 are members that house hub bearings that rotatably support hubs around axles. To the hubs, the right front wheel FWR and the left front wheel FWL are attached.

The housing 160 each include the knuckle arm 161 formed to protrude forward relative to the axle.

The housings 160 are each turnably supported around the kingpin axis serving as a predetermined rotational center axis.

The housings 160 are each pushed and pulled by the rack shaft 130 through the tie rods 150 in the vehicle width direction to thereby turn around the kingpin axis to steer the right front wheel FWR and the left front wheel FWL.

The actuator unit 170 is a drive device that rotationally drives the pinion shaft 173, to generate a rack thrust force and perform a steering operation.

The actuator unit 170 includes the motor 171, a gearbox 172, the pinion shaft 173, and the like.

The motor 171 is an electric actuator that generates a driving force to be applied to the pinion shaft 173.

A rotation direction and output torque of the motor 171 are controlled by the steering control unit 10.

An output shaft angular position (rotation angle) of the motor 171 is configured to be fed back to the steering control unit 10.

The gearbox 172 includes a reduction gear train that decelerates a rotational output (or amplifies torque) of the motor 171 to thereby transmit the reduced rotational output to the pinion shaft 173.

The pinion shaft 173 is a rotation shaft that is rotationally driven by the motor 171 through the gearbox 172.

At a tip portion of the pinion shaft 173, the pinion gear is formed. The pinion gear meshes with the rack gear 131 of the rack shaft 130 and drives the rack shaft 130.

The steering device 100 is a steer-by-wire steering device with a variable steering gear ratio.

The steering control unit 10 has a function of changing the steering gear ratio by changing a correlation between a rotation angle (steering wheel angle) of the steering wheel 110 detected by the steering wheel angle sensor 112 and an actual steering angle actually taken by the front wheels.

The steering gear ratio is a ratio of a change in the steering wheel angle to a change in the actual steering angle. As the steering gear ratio has a smaller value, the steering gear ratio becomes quicker. When the change in the steering wheel angle is equivalent, the change in the actual steering angle becomes larger.

FIG. 3 is a graph schematically illustrating an example of a correlation between a vehicle speed and the steering gear ratio.

In FIG. 3, an abscissa axis denotes the vehicle speed, and an ordinate axis denotes the steering gear ratio.

As illustrated in FIG. 3, in the low-speed region, the steering gear ratio is set to be small and has a quick characteristic. Meanwhile, the steering gear ratio is set to increase in accordance with an increase in the vehicle speed, and is set to be slow to ensure the sense of stability of the vehicle.

FIG. 4 is a graph schematically illustrating an example of a correlation between the steering angle and the steering gear ratio.

In FIG. 4, an abscissa axis denotes the steering angle (steering wheel angle), and an ordinate axis denotes the steering gear ratio.

As illustrated in FIG. 4, the steering gear ratio is set to be large in a region where the steering wheel angle is small, and is set to be small in a region where the steering wheel angle is large.

The steering control unit 10 includes a map created based on the tendencies illustrated in FIGS. 3 and 4, and sequentially changes the steering gear ratio of the steering device 100 in accordance with a travel state of the vehicle.

Figure 5:
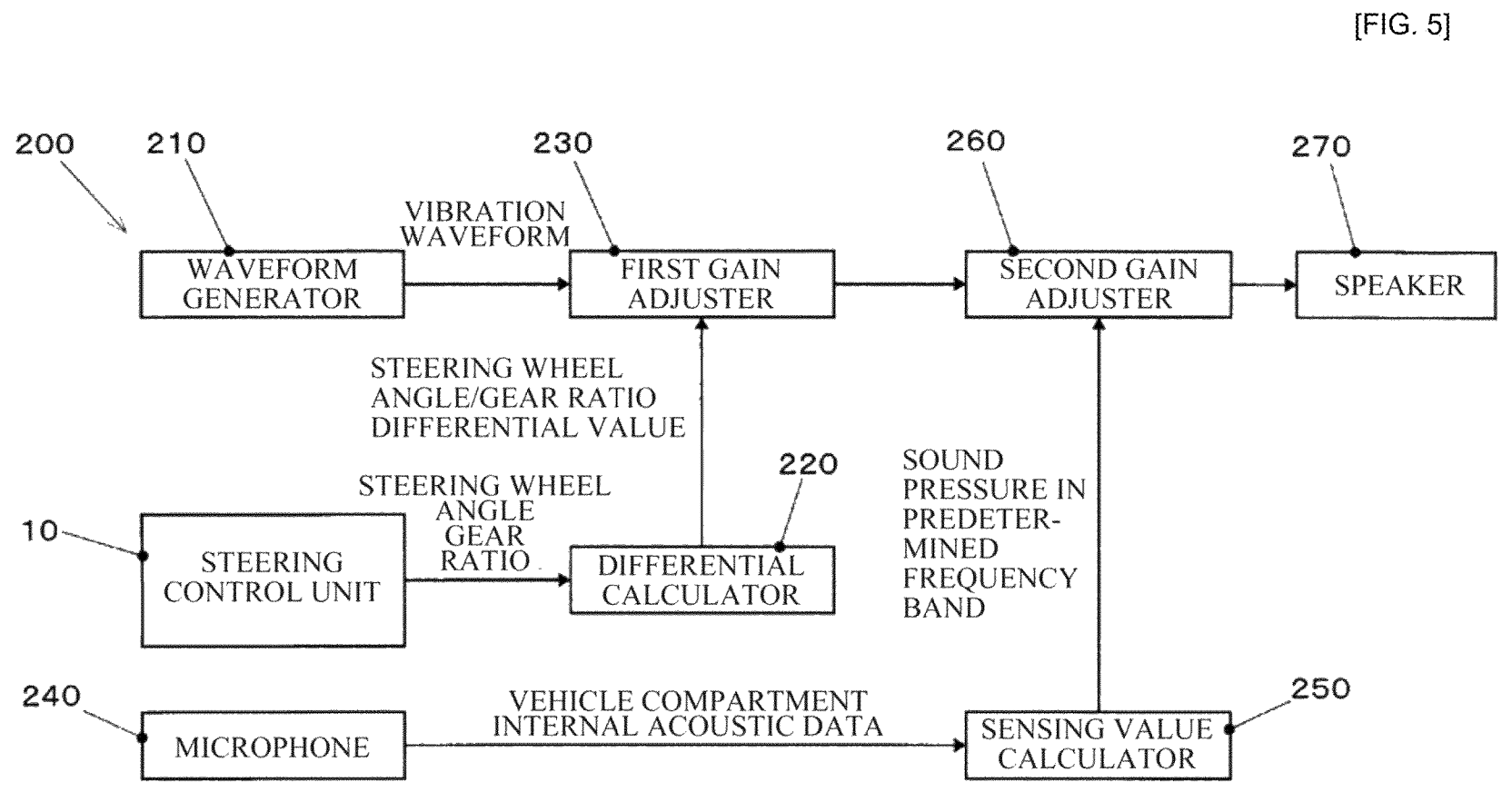

FIG. 5 is a diagram schematically illustrating a system configuration of the information presentation device according to the embodiment.

The information presentation device 200 vibrates the air around the ear of an occupant by the speaker 270 disposed in the vehicle compartment, and notifies the occupant of a sign of occurrence of a behavior of the vehicle with an acoustic signal.

The information presentation device 200 includes, for example, a waveform generator 210, a differential calculator 220, a first gain adjuster 230, a microphone 240, a sensing value calculator 250, a second gain adjuster 260, and the speaker 270.

The waveform generator 210 generates a vibration waveform that is a waveform of the acoustic signal to be generated by the speaker 270.

FIG. 6 is a graph schematically illustrating examples of the vibration waveform according to the first embodiment.

In FIG. 6, abscissa axes represent time, and ordinate axes represent a voltage (an amplitude).

For example, as illustrated in Part (a) of FIG. 6, the vibration waveform may be a sine wave.

Further, for example, as illustrated in Part (b) of FIG. 6, the vibration waveform may be a waveform in which multiple sine waves having different wavelengths are superimposed on (combined with) each other.

Furthermore, the vibration waveform is not limited to these waveforms and may be changed as appropriate.

For example, as the vibration waveform, various waveforms such as a square wave, a triangular wave, or a waveform simulating a traveling sound of the vehicle may be used alone or in combination with other waveforms.

In the embodiment, a frequency of the vibration waveform may be set to have a dominant frequency in a range of, for example, 100 Hz to 400 Hz, more preferably 150 Hz to 300 Hz.

Reasons for this will be described below.

Sensory receptors that sense vibration when the air around the occupant is vibrated include, for example, Merkel's cells, Meissner's corpuscles, and Pacini's corpuscles.

FIG. 7 is a chart schematically illustrating respective timings of electrical pulses emitted by the receptors upon receiving stimuli.

In FIG. 7, abscissa axes represent time, and ordinate axes represent a pressure, an electrical pulse generation state of the Merkel's cells, an electrical pulse generation state of the Meissner's corpuscles, and an electrical pulse generation state of the Pacini's corpuscles in order from the top.

The Merkel's cells are relatively slow in response and respond to a direct current component.

The Meissner's corpuscles respond to occurrence of a rate (a speed) of change in a contact pressure.

The Pacini's corpuscles respond to a transient change moment. The Pacini's corpuscles are considered as most sensitive of these receptors.

The sensitivity of the Pacini's corpuscles is considered as most favorable as the receptors with which the occupant perceives minute vibration as auditory and tactile composite information.

FIG. 8 is a diagram illustrating respective distributions of sensitivity to a frequency of the Pacini's corpuscles and the Meissner's corpuscles.

In FIG. 8, an abscissa axis represents the frequency, and an ordinate axis represents a supraliminal amplitude. A smaller value of the supraliminal amplitude represents higher sensitivity.

As illustrated in FIG. 8, the Pacini's corpuscles exhibit favorable sensitivity in a region of about 100 Hz to about 400 Hz, particularly more favorable sensitivity in a region of 150 Hz to 300 Hz.

These regions are included in a range of 20 Hz to 20 kHz that is generally considered as a human audible range.

The dominant frequency of the vibration waveform may be set to 250 Hz, for example.

The differential calculator 220 acquires, from the steering control unit 10, information regarding the rotation angle (steering wheel angle) $\theta_H$ of the steering wheel 110 detected by the steering wheel angle sensor 112, and the current steering gear ratio $R_{STG}$.

The differential calculator 220 calculates the actual steering angle $\theta$ of the front wheels by first multiplying the steering wheel angle $\theta_H$ by a reciprocal of the steering gear ratio $R_{STG}$ (dividing the steering wheel angle $\theta_H$ by the steering gear ratio $R_{STG}$).

The steering control unit 10 serves as a steering gear ratio detector of the invention.

Steering wheel angle $\theta_H$/steering gear ratio $R_{STG}$=actual front wheel steering angle $\theta$ Thus, the differential calculator 220 calculates a differential value $\Delta\theta$ obtained by time-differentiating the actual steering angle $\theta$ of the front wheels.

The differential calculator 220 successively transmits the calculated differential value $\Delta\theta$ to the first gain adjuster 230.

The first gain adjuster 230 performs first gain adjustment to be described below on a fundamental wave of the vibration waveform generated by the waveform generator 210.

The first gain adjustment is performed to change a gain G1 that is an output gain by which a voltage of the vibration waveform is to be multiplied, depending on the differential value (a change rate per hour) of the actual steering angle $\theta$ (a parameter correlated with an amount of steering) of the front wheels in the steering device 100.

FIG. 9 is a graph schematically illustrating an example of the gain adjustment performed by the first gain adjuster.

In FIG. 9, an abscissa axis represents an absolute value of the differential value $\Delta\theta$ of the steering angle $\theta$ of wheels FW, and an ordinate axis represents the gain G1 by which the voltage of the vibration waveform is to be multiplied.

The gain G1 may be configured to increase in accordance with an increase in the absolute value of the differential value 40.

Further, the first gain adjuster 230 may be configured to maximize an increase rate of the gain G1 relative to the increase in the absolute value of the differential value $\Delta\theta$ in a region where the absolute value of the differential value $\Delta\theta$ is minute, and decrease the increase rate in accordance with the increase in the absolute value of the differential value $\Delta\theta$.

The gain G1 by the first gain adjuster 230 may be calculated, for example, based on the absolute value of the differential value $\Delta\theta$ of the steering angle $\theta$ using a logarithmic function.

The gain G1 is expressed by, for example, Expression 1 below.

$$\text{Gain } G1=\log(\text{absolute value of steering angle differential value }\Delta\theta\times\text{coefficient } k) \quad \text{(Expression 1)}$$

The coefficient k may be a value that is set, for example, at a development stage of the vehicle, in accordance with characteristics (such as a yaw gain relative to the steering angle $\theta$ or a barycentric position) of the vehicle.

Moreover, the coefficient k is corrected in accordance with the outputs of the tire internal pressure monitoring device 20 and the environment recognition unit 30.

The coefficient k is increasingly corrected in accordance with the increase in the tire internal pressure detected by the tire internal pressure monitoring device 20.

Furthermore, when the environment recognition unit 30 recognizes deterioration of visibility of the surroundings of the subject vehicle, the coefficient k is increasingly corrected.

For example, when the stereo camera device 31 recognizes a state of poor visibility such as fog or backlight, when the illuminance sensor 32 recognizes predetermined dark environment such as at night or in a tunnel, and when the rainfall sensor 33 detects rainfall, the coefficient k is increasingly corrected assuming that the visibility of the surrounding is deteriorated.

The microphone 240 is a sound collection device that is provided in the vehicle compartment and collects background noise in the vehicle compartment.

The microphone 240 is preferably disposed at a position close to the ear of the occupant, and may be provided on, for example, a headrest of a seat.

An output of the microphone 240 is transmitted to the sensing value calculator 250.

The sensing value calculator 250 extracts a component of a predetermined frequency band from the background noise of the vehicle acquired by the microphone 240, and transmits a sound pressure of the extracted component as a sensing value to the second gain adjuster 260.

FIG. 10 is a graph schematically illustrating an example of an output history of the microphone.

In FIG. 10, an abscissa axis represents time, and an ordinate axis represents the sound pressure of the background noise acquired by the microphone 240.

The sensing value calculator 250 performs fast Fourier transform (FFT) processing on an acoustic signal of the background noise acquired by the microphone 240 to thereby convert the resultant acoustic signal into a frequency domain, and further performs bandpass filter processing on the frequency domain to thereby extract the component in the predetermined frequency band.

The frequency band to be extracted is set to include the dominant frequency of the vibration waveform to be outputted by the waveform generator 210.

The sensing value calculator 250 sets an average sound pressure in the extracted frequency band to the sensing value to be used for second gain adjustment.

FIG. 11 is a graph illustrating an example of a correlation between the sound pressure and the frequency of the background noise.

In FIG. 11, an abscissa axis represents the frequency, and an ordinate axis represents the sound pressure.

The bandpass filter may be configured to extract, for example, the frequency band adjacent to the dominant frequency (for example, 250 Hz) of the vibration waveform of the waveform generator 210.

The sound pressure in the extracted frequency band (for example, an average value in the frequency band) is provided as the sensing value to the second gain adjuster 260.

The second gain adjuster 260 further performs the second gain adjustment to be described below on the vibration waveform having been subjected to the first gain adjustment.

The second gain adjustment is performed to change the gain of the vibration waveform in accordance with the sensing value of the vehicle compartment internal noise to regulate an output amplitude of the vibration waveform in accordance with a change in the background noise (such as drivetrain noise, aerodynamic noise, or road noise) in traveling of the vehicle.

The second gain adjuster 260 performs the second gain adjustment, based on an output of the sensing value calculator 250.

The second gain adjuster 260 sets the gain G2, based on the sensing value outputted by the sensing value calculator 250.

FIG. 12 is a graph schematically illustrating an example of the gain adjustment performed by the second gain adjuster.

In FIG. 12, an abscissa axis represents the sensing value, and an ordinate axis represents the gain G2 by which the voltage of the vibration waveform is to be multiplied.

The gain G2 may be configured to increase in accordance with an increase in the sensing value.

The gain G2 is set to inhibit sound pressure of audio of a vibration amplitude outputted from the speaker 270 from dominating the sound pressure of the background noise near the ear of the occupant.

Preferably, the gain G2 may be set to cause the audio of the vibration amplitude to be hidden in the background noise of the vehicle and have a sound pressure level subconsciously audible by the occupant.

An output value (a voltage) A of the vibration waveform having been subjected to the first gain adjustment and the second gain adjustment described above is expressed by Expression 2 below.

$$\text{Output value } A = \text{output value of waveform generator} \times \text{gain } G1 \times \text{gain } G2 = \text{output value of waveform generator} \times \log(\text{absolute value of steering angle differential value } \Delta\theta \times \text{coefficient } k) \times \text{gain } G2 \tag{Expression 2}$$

The speaker 270 is a vibration device that is disposed in the vehicle compartment and vibrates the air around the occupant in the vehicle compartment to thereby generate the audio, using the output value A.

Arrangement of the speaker 270 will be described below in detail.

The speaker 270 may be configured to serve also as a speaker to be used for audio reproduction or the like by an in-vehicle audio device, for example.

Further, a speaker 270 dedicated to the information presentation device 200 may be provided.

FIG. 13 is a diagram schematically illustrating arrangement inside the vehicle compartment of the vehicle provided with the information presentation device according to the embodiment.

The inside of the vehicle compartment 300 is provided with, for example, a driver's seat 310, a front passenger seat 320, a rear seat 330, and an instrument panel 340.

The driver's seat 310 and the front passenger seat 320 are each a front seat provided in the front of the vehicle compartment.

The driver's seat 310 and the front passenger seat 320 are provided side by side in the vehicle width direction.

In the example illustrated in FIG. 13, the vehicle is, for example, a so-called right-hand drive vehicle in which the driver's seat 310 is provided on the right side relative to a lateral center of the vehicle body and the front passenger seat 320 is provided on the left side relative to the lateral center of the vehicle body.

The driver's seat 310 and the front passenger seat 320 each include a cushion, a seat back, and a headrest. An occupant rests his/her buttocks and thighs on the corresponding cushion. The seat back is disposed behind a back of the corresponding occupant. The headrest is provided behind a head of the corresponding occupant.

The rear seat 330 is a bench-shaped seat disposed behind the driver's seat 310 and the front passenger seat 320.

The rear seat 330 allows, for example, two occupants to be seated side by side.

The rear seat 330 includes cushions, seat backs, and headrests. The occupants each rest his/her buttocks and thighs on the corresponding cushion. The seat backs are each disposed behind a back of the corresponding occupant. The headrests are each provided behind a head of the corresponding occupant.

The rear seat 330 includes a right seat area disposed behind the driver's seat 310 and a left seat area disposed behind the front passenger seat 320.

The instrument panel 340 is a member that is provided adjacent to a front end of the vehicle compartment 300 and houses, for example, a meter display, a ventilating/air conditioning/heating device, and an infotainment device.

The instrument panel 340 is disposed to oppose the respective occupants who are seated on the driver's seat 310 and the front passenger seat 320.

In the example illustrated in FIG. 13, for example, four respective speakers 270 are provided separately in the front and back of the vehicle compartment 300 and on the left and right of the vehicle compartment 300, for example.

Hereinafter, the speakers 270 will be described with reference numerals having letters corresponding to respective positions.

A right front speaker 270FR is disposed adjacent to a right end of the instrument panel 340.

The speaker 270FR is a directional speaker that is directed toward the head (an ear) of the occupant who is seated on the driver's seat 310.

A left front speaker 270FL is disposed adjacent to a left end of the instrument panel 340.

The speaker 270FL is a directional speaker that is directed toward the head (an ear) of the occupant who is seated on the front passenger seat 320.

A right rear speaker 270RR is disposed on the headrest of the driver's seat 310.

The speaker 270RR is a directional speaker that is directed toward the head (an ear) of the occupant who is seated on the right side of the rear seat 330.

A left rear speaker 270RL is disposed on the headrest of the front passenger seat 320.

The speaker 270RL is a directional speaker that is directed toward the head (an ear) of the occupant who is seated on the left side of the rear seat 330.

In the embodiment, with the configuration described above, the audio of the amplitude corresponding to the differential value $\Delta\theta$ of the steering angle $\theta$ is emitted from the speaker 270 to the occupant when the driver performs the steering operation to thereby change the steering angle $\theta$ of the wheels W.

The audio is masked by the traveling sound (the background noise) of the vehicle and is thus difficult for the occupant to consciously recognize as a sound, but allows the occupant to subconsciously predict the occurrence of the behavior of the vehicle involving generation of a lateral acceleration rate and a yaw rate.

According to the embodiment described above, it is possible to obtain the following effects.

(1) By generating the audio in which the sound pressure increases in accordance with the increase in the absolute value of the differential value (so-called steering speed) of the parameter correlated with the amount of steering of the steering device 100, it is possible to allow, by the audio, the occupant to predict the occurrence of the behavior, at the initial stage of the steering before the lateral acceleration rate, the yaw rate, the roll angle, and the like actually occur in the vehicle 1.

This makes it possible to enhance the occupant's predictability of the vehicle behavior, and prevent the occupant from having a feeling of abruptness about the behavior of the vehicle 1.

Moreover, by increasing the output gain of the vibration waveform in accordance with the increase in the absolute value of the differential value of the value obtained by multiplying the amount of the steering operation by the reciprocal of the steering gear ratio, it is possible to allow the occupant to appropriately grasp the information regarding the actual steering angle of the right front wheel FWR and the left front wheel FWL even in the vehicle 1 of the variable steering gear ratio.

Furthermore, by generating the vibration waveform in accordance with the driving operation, it is possible to recognize the amount of operation in a finer range than the resolution of the steering angle inherent in the driver. Accordingly, it is possible to make a finer control. This enhances the controllability even in a case with, for example, the setting of the quick steering gear ratio, leading to easier driving.

(2) The vibration waveform has the dominant frequency included in the frequency band of 100 to 400 Hz. Accordingly, it is possible to use, for example, the Pacini's corpuscles that are highly sensitive to the skin sensation in the audible range, and to improve the occupant's perception of the sound and the occupant's recognition of the skin sensation by the audio. Hence, it is possible to transmit the information to the occupant more reliably.

(3) By setting the output gain to inhibit the sound pressure generated by the vibration of the vibrator from dominating the background noise while the vehicle 1 is traveling, near the ear of at least one occupant, the audio generated by the vibration by the vibrator is drowned out by the background noise of the vehicle 1. Hence, it is possible to prevent the occupant from feeling that the sound is annoying, and to appropriately transmit the information.

(4) By adjusting the output gain of the vibration waveform of the information presentation device based on the monitoring result of the tire internal pressure, it is possible to suppress the change in the torque gradient to be felt by the driver and to ensure ease of driving.

(5) In a situation with poor visibility, a rate of dependency on the auditory sense and the tactile sense as the auxiliary senses becomes higher. Considering this, increasing the output gain of the vibration waveform of the information presentation device makes it possible to increase the amount of information to be obtained from the auditory sense and the tactile sense, and to ensure the ease of driving.

Modification Examples

The invention is not limited to the embodiments described above, and various modifications and changes are possible. Such modifications and changes fall within the technical scope of the invention as well.

(1) The specific configurations of the information presentation device and the vehicle are not limited to the forgoing embodiments, but may be changed as appropriate.

(2) In the embodiment, the vibration waveform is presented to the occupant through the speaker as the audio information. However, instead of this, or together with this, a configuration may be adopted in which a member in contact with the occupant is vibrated to present the occupant with the information as tactile vibration.

(3) In the embodiment, the steering device is, for example, a steer-by-wire steering device. However, the invention may be applicable to a steering device of a variable steering gear ratio other than a steer-by-wire steering device.

DESCRIPTION OF REFERENCE NUMERALS

1 Vehicle
10 Steering control unit
20 Tire internal pressure monitoring device
30 Environment recognition unit
31 Stereo camera device
32 Illuminance sensor
33 Rainfall sensor
FWR Right front wheel
FWL Left front wheel
100 Steering device
110 Steering wheel
111 Steering shaft
112 Steering wheel angle sensor
113 Torque sensor
120 Reaction force generation device
130 Rack shaft
131 Rack gear
140 Rack housing
141 Rack boot
150 Tie rod
151 Ball joint
152 Ball joint
160 Housing
161 Knuckle arm
170 Actuator unit
171 Motor
172 Gearbox
173 Pinion shaft
200 Information presentation device
210 Waveform generator
220 Differential calculator
230 First gain adjuster
240 Microphone
250 Sensing value calculator
260 Second gain adjuster
270 Speaker
300 Vehicle compartment
310 Driver's seat
320 Front passenger seat
330 Rear seat
340 Instrumental panel

The invention claimed is:

1. An information presentation device configured to be provided in a vehicle including a steering device, the steering device being configured to steer a wheel and having a variable steering gear ratio, the information presentation device comprising:

an amount-of-steering-operation detector configured to detect an amount of a steering operation by a driver;

a steering gear ratio detector configured to detect the steering gear ratio;

a parameter calculator configured to calculate a parameter correlated with the amount of the steering operation and the steering gear ratio;

a vibration waveform generator configured to generate a vibration waveform;

a vibrator configured to cause vibration of one or both of air around an occupant and a member in contact with the occupant, using the vibration waveform; and a gain adjuster configured to increase an output gain of the vibration waveform in accordance with an increase in an absolute value of a differential value of the parameter.

2. The information presentation device according to claim 1, wherein the vibration waveform includes a dominant frequency included in a frequency band of 100 to 400 Hz.

3. The information presentation device according to claim 1, wherein the gain adjuster is configured to set the output gain to inhibit sound pressure generated by the vibration by the vibrator from dominating a background noise while the vehicle is traveling, near an ear of at least one occupant.

4. The information presentation device according to claim 1, comprising an internal pressure detector configured to detect tire internal pressure of the wheel, wherein the gain adjuster is configured to increase the output gain in accordance with an increase in the tire internal pressure.

5. The information presentation device according to claim 1, comprising a low visibility detector configured to make detection of low visibility around the subject vehicle, wherein the gain adjuster is configured to increase the output gain in accordance with the detection of the low visibility.

6. The information presentation device according to claim 1, wherein the parameter is a value obtained by multiplying the amount of the steering operation by a reciprocal of the steering gear ratio.

7. The information presentation device according to claim 6, wherein the vibration waveform includes a dominant frequency included in a frequency band of 100 to 400 Hz.

8. The information presentation device according to claim 6, wherein the gain adjuster is configured to set the output gain to inhibit sound pressure generated by the vibration by the vibrator from dominating a background noise while the vehicle is traveling, near an ear of at least one occupant.

9. The information presentation device according to claim 6, comprising an internal pressure detector configured to detect tire internal pressure of the wheel, wherein the gain adjuster is configured to increase the output gain in accordance with an increase in the tire internal pressure.

10. The information presentation device according to claim 6, comprising a low visibility detector configured to make detection of low visibility around the subject vehicle, wherein the gain adjuster is configured to increase the output gain in accordance with the detection of the low visibility.

* * * * *